Nov. 25, 1969  H. H. HOGE  3,480,851
SOLID STATE VIBRATOR
Filed Nov. 17, 1967
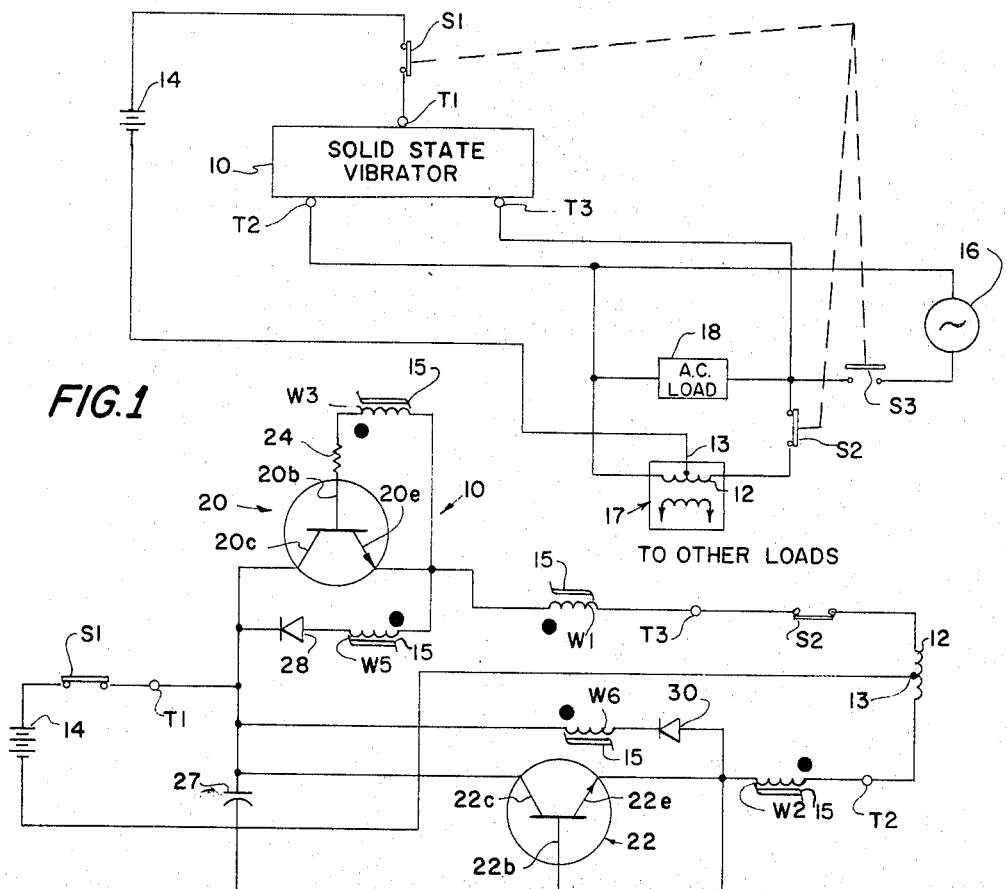
FIG. 1
FIG. 2
WINDINGS W1 TO W6 ARE
ALL WOUND ON A
COMMON CORE 15
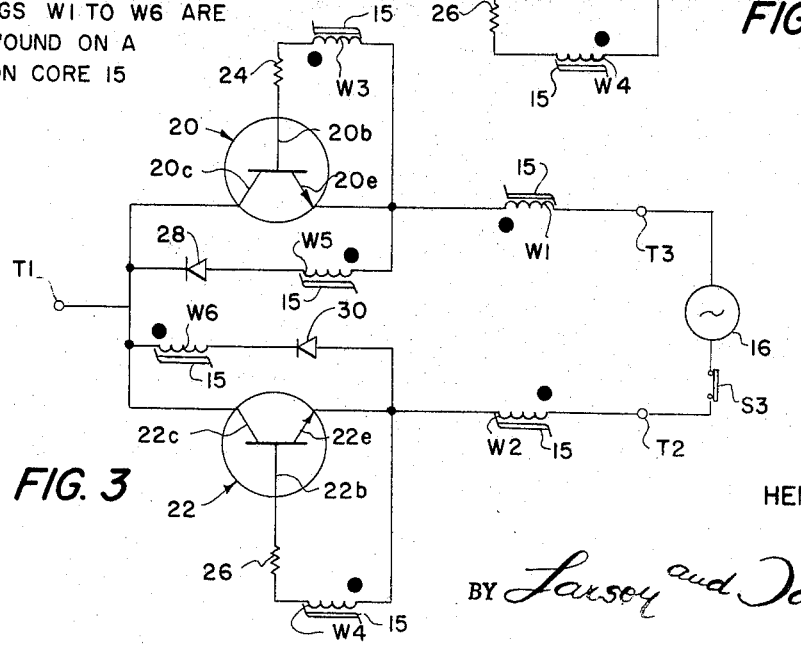
FIG. 3
INVENTOR
HENRI HOGE
BY Larson and Taylor
ATTORNEYS United States Patent Office 3,480,851
Patented Nov. 25, 1969

3,480,851
SOLID STATE VIBRATOR
Henri H. Hoge, Baltimore, Md., assignor to Cambridge Scientific Industries, Cambridge, Md., a corporation of Maryland
Filed Nov. 17, 1967, Ser. No. 683,857
Int. Cl. H02m 7/42
U.S. Cl. 321—8    10 Claims

ABSTRACT OF THE DISCLOSURE

A solid state vibrator-inverter circuit of the square loop magnetic core type is provided with means for causing the vibrator circuit to be degenerative when an alternating voltage is impressed on its output terminals and therefor nonoperative under these circumstances. In a specific vibrator circuit employing transistors the means comprises an additional winding connected across the collector-to-emitter path of each transistor and wound on the same core as the other vibrator windings. A diode is connected in series with each of the windings to render the windings inoperative during inverter operation.

---

The present invention relates to solid state vibrator circuits and more particularly to protection for solid state vibrator circuits from the adverse effects caused by exposing such circuits to an AC voltage source.

There are many known circuits used in the conversion of DC power to AC power. One well-known circuit frequently used for this purpose employs a square loop magnetic core for frequency control. This circuit, in brief, comprises a pair of active solid state devices which are alternately conducting and non-conducting depending in general on the rate and direction of magnetization of the magnetic core and the induced polarities of the individual driving windings associated with the active devices. In certain circumstances it may be necessary to expose a square loop core inverter of the type described to an AC power source and then to revert back to the normally used DC power. An example of such circumstances are those surrounding the launching of a missile wherein prior to launch the electrical circuits of the missile are fed from an external AC source. Such an AC source can cause the solid state inverter described above to become regenerative thereby causing damage to or destruction of the solid state elements used therein.

A further example of where this problem might arise is where an AC source is used in furnishing emergency power to a system including such a circuit.

One approach to solving the problem described might involve the inclusion of series-connected devices such as inductive chokes for performing an AC blocking function in the circuit. However, it is obvious that such an expedient would greatly impair the overall conversion efficiency of the circuit.

It is the primary object of the present invention, therefore, to provide means for preventing a circuit of the type described from becoming regenerative when exposed to an AC source without compromising the efficiency of the circuit.

In accordance with the invention this and other objects are achieved through the addition of auxiliary windings to a solid state inverter circuit which, where the circuit is exposed to AC power, alternately limit the driving voltage on one of the solid state devices to a level which prevents that device from conducting.

In accordance with a presently preferred embodiment of the invention the auxiliary windings are wound on the common square loop magnetic core across the collector-to-emitter junctions of a pair of transistors used in the circuit. A pair of diodes are connected in series with the individual auxiliary windings and aid in rendering the auxiliary windings inoperative during normal inverter operation. With an AC source connected across the vibrator terminals, during alternate half cycles one transistor will be saturated and the other will be biased for conduction. The diodes are poled so that the winding across the saturated transistor is operative and thus the voltage thereon is clamped to a low value. Because all of the circuit windings are on the same core the volts per turn ratio for the auxiliary winding is determinative of the volts per turn ratio for the other windings and thus voltage on the driving winding of the transistor biased for conduction may be limited to value incapable of rendering the transistor conducting. In this way destruction of the transistors through regenerative circuit operation is prevented.

Other objects and advantages of the present invention will be apparent from the detailed description, reference being made to the drawings in which:

FIGURE 1 is a schematic diagram of a solid vibrator circuit exposed to an AC source;

FIGURE 2 is a schematic diagram of the circuit of the invention during DC operation; and FIGURE 3 is a schematic diagram of the circuit of the present invention during AC operation.

Referring to FIGURE 1, a solid state vibrator 10 is shown which may be exposed to an AC source 16. Closing of a switch S3 connects an AC source 16 and an AC load 18 across the output terminals T2 and T3 of vibrator 10. S3 is mechanically interconnected with a pair of switches S1 and S2 so that when S3 is closed S1 and S2 are opened and when S1 and S2 are closed S3 is opened. S1 controls the connection of a DC source shown as a battery 14 between terminal T1 and a center tap 13 on the primary winding 12 of an external power transformer 17 while S2 when closed completes the connection of the primary winding 12 of transformer 17 between terminals T2 and T3.

The vibrator of the invention is shown in FIGURE 2 with S1 and S2 closed and thus with the AC source 16 disconnected from the circuit. The solid state vibrator 10 basically comprises a pair of n-p-n transistors 20 and 22 and four windings W1 to W4. It will of course be appreciated that p-n-p transistors may also be employed. Windings W1 and W2 are connected in series with the output winding 12 while biasing or driving windings W3 and W4 are connected in the base-to-emitter circuits of transistors 20 and 22, respectively. Thus tracing through the circuit starting at terminal T3, one side of winding W1 is connected to terminal T3 while the other side is connected to one side of winding W3 and to the emitter 20e of transistor 20. The other side of winding W3 is connected through a base resistor 24 to the base 20b of transistor 20. Collector 20c of transistor 20 and collector 22c of transistor 22 are connected together and through terminal T1 and switch S1 are connected to the positive terminal of battery 14. The base 22b of transistor 22 is connected through base resistor 26 and winding W4 to a point on the connection between emitter 22e and one side of winding W2. A capacitor 27 is connected between collector 22c and the side of winding W4 not connected to base 22b of transistor 22. The negative terminal of battery 14 is connected to center tap 13 of external power transformer 17. Windings W1 to W4 are all wound on a common magnetic core 15.

In accordance with a presently preferred embodiment of the invention windings W5 and W6 are connected across the collector-to-emitter paths of transistors 20 and 22, respectively, and are wound on common core 15. A diode 28 is connected in series with winding W5 and a diode 30 is connected in series with winding W6. Diodes 28 and 30 as employed to aid in rendering windings W5 and W6 inoperative during normal inverter operation in a manner described hereinbelow.

The operation of the inverter circuit of FIGURE 2 with windings W5 and W6 removed is well known in the art but will be described briefly for the purpose of completeness. Biasing or driving windings W3 and W4 are phased with respect to the windings W1 and W2 as illustrated in FIGURE 2 by the conventional dot notation so that when the transistor 20 is conducting, winding W3 will maintain transistor 20 fully conducting and winding W4 will maintain transistor 22 fully cut off or blocked. Similarly, when transistor 20 is conducting the winding W4 will maintain transistor 22 conducting while winding W3 will maintain transistor 22 fully blocked.

The core 15 is preferably constructed of material having a substantially square or rectangular hysteresis loop. Core 15 is driven to saturation by conduction of transistors 20 and 22. For example, assuming that transistor 20 begins conducting more heavily than transistor 22, the current through transformer winding W1 will cause, by transformer action, resultant current flow in windings W3 and W4 which will bias transistor 20 in the conducting direction and bias transistor 22 to cutoff, respectively, as set forth hereinbefore. Current flow through transformer winding W1 causes a linear increase in the magnetization of core 15 until saturation thereof occurs. When core 15 saturates the rate of change of magnetization approaches zero and the drive current through winding W3 will terminate thus causing previously conducting transistor 20 to become nonconducting. The flux in core 15 returns to its residual flux magnitude and this reduction in flux induces a voltage in winding W4 to initiate conduction in transistor 22. Due to regenerative action transistor 22 quickly becomes fully conductive and core 15 is driven to conduction in the opposite direction. Transistor 20 is similarly driven to cutoff. When saturation of core 15 is again reached, the conductive conditions of transistors 20 and 22 again reverses and the cycle begins again.

With windings W5 and W6 and associated diodes 28 and 30 connected in the inverter circuit, the operation of the circuit is the same as just described, that is, the presence of windings W5 and W6 has no effect on normal circuit operation. To explain, assuming again that transistor 20 is conducting and that windings W5 and W6 are phased so that the induced voltages are as indicated, with the dotted ends of the windings positive, diode 28 is poled so that the cathode is positive with respect to the anode and thus diode 28 will be nonconductive and winding W5 will be inoperative. When transistor 20 is conducting, transistor 22 is nonconducting and thus because of the center tap arrangement twice the source voltage appears across transistor 22. This voltage across transistor 22 will always be higher than the voltage induced into winding W6 and thus winding W6 will also be inoperative.

During the next half cycle transistor 20 and 22 will have exchanged roles, that is, transistor 20 will be "off" and transistor 22 will be "on" and windings W5 and W6 will again be inoperative.

From the foregoing it can be seen that windings W5 and W6 will be inoperative during the entire operation of the vibrator circuit as an inverter.

Referring to FIGURE 3 the vibrator circuit is shown under conditions where an AC source 16 is connected across terminals T3 and T2 and terminal T1 is open. FIGURE 3 corresponds to FIGURE 1 with switch S3 closed and switches S1 and S2 open.

With windings W5 and W6 removed the circuit of FIGURE 3 will become regenerative and damage to or destruction of the transistors 20, 22 will likely result. The operation of the circuit of FIGURE 3 with windings W5 and W6 removed is briefly set forth below. Assuming that terminal T3 is positive with respect to T2 and that the nondotted ends of the windings are positive, transistor 22 will be biased for conduction through the collector-to-emitter path thereof. As transistor 22 conducts the current through windings W1 and W2 increases and the increase is reflected through transformer action in increase current drive in winding W4 thus providing increased base drive for transistor 22. With transistor 22 conducting more heavily, the increased current through transistor 22 will be in turn cause increased current in windings W1 and W2 and so on. Under these conditions and with no load in the circuit transistor 22 cannot saturate. The temperature of transistor 22 will increase and the base-to-collector amplication factor $\beta$ will increase. The regenerative action just described will continue in this manner until transistor 22 is damaged or destroyed.

The addition of windings W5 and W6 prevents the vibrator circuit from becoming regenerative. The operation of the circuit of FIGURE 3 with the windings W5 and W6 connected as described is set forth below.

Again assume that terminal T3 is positive with respect to terminal T2 and that the nondotted ends of the windings are positive. Under these conditions the voltage on winding W3 will be such that the emitter 20e of transmitter 20 is positive with respect to the base 20b, and, thus, transistor 20 is in an inverted connection wherein the collector 20c acts as an emitter and the emitter 20e acts as a collector. Transistor 20 is heavily saturated under these conditions. To explain, it is noted that although the reverse base-to-collector current-amplification facter $\beta'$ is on the order of one-tenth of the value of the forward base-to-collector current-amplification factor $\beta$, this amplification is sufficient to cause saturation. Base resistance 24 is very small resistance, for example, one ohm, while the resistance of the winding W3 is also very small because of the relatively few turns which make up the winding W3. Winding W3 may, in accordance with a specific embodiment of the invention, consist of sixty turns. There is, therefore, a very low impedance connection between the new collector 20e and the base 20b. Further, with transistor 22 biased for forward conduction, that is, with the emitter 22e negative with respect to the base 22b but not turned on, the current through the collector to emitter path is limited to a very small value, on the order of approximately one-hundred milliamperes maximum. This conditon of transistor 22 limits the total circuit current to this very low value. With the very low impedance connection between the new collector 20e and the base 20b, circuit current will flow through the base 20b to the new emitter 20c and will be amplified by a factor of $\beta'$. However, with the total circuit current limited to the very low value dictated by the high impedance collector-to-emitter path in transistor 22, transistor 20 must operate in its saturated region.

The purpose of including windings W5 and W6 is, as stated, to prevent transistor 22 from turning on. Under the circumstances set forth, i.e., with terminal T3 positive with resepct to terminal T2 and the nondotted end of winding W6 positive, diode 30 will be back-biased. Winding W6 will, therefore, be effectively removed from the circuit. Conversely, with the nondotted end of winding W5 positive, diode 28 will be biased for conduction and will conduct when the voltage on the winding W5 exceeds the diode voltage drop which, for a silicon diode, is about one-half volt. With diode 28 conducting there will be current path through winding W5, diode 28 and transistor 20 back to emitter terminal 20e. This path exists because the voltage on winding W5 is greater than that on winding W1 because of the stepup transformer relationship between the two windings. In accordance with a specific example winding W1 consists of 7 turns while windings W5 consists of 200 turns. With diode 28 conducting the voltage on winding W5 is limited to a very small value by the clamping action of diode 28 and saturated transistor 20. With diode 28 conducting and transistor 20 saturated, these elements may be represented by small batteries having voltages of on the order of one-half and three-tenths of a volt, respectively. Thus the voltage on winding W5 will be limited to the sum of these small voltages or about eight-tenths of a volt. By dividing this voltage by the number of turns of winding W5 the voltage per turn ratio can be determined and because all the windings are wound on the same core 15 this voltage per turn ratio will obtain for all of the windings on core 15. Thus, if winding W4, the base-to-emitter winding for transistor 22, is limited to relatively few turns the voltage between the base 22b and the emitter 22e can be kept below that required to turn on transistor 22. With the specific values previously given the voltage per turn ratio would be about four millivolts and thus the voltage on winding W4 is limited to about twenty-four hundredths of a volt which is low enough to prevent transistor 22 from conducting. Thus transistor 22 supports the source voltage, that is, the source voltage will appear across transistor 22, during this half cycle.

During the next half cycle transistors 20 and 22 exchange roles and transistor 20 supports the source voltage. It can be seen from the foregoing that the vibrator circuit remains nonconductive when an alternating voltage is applied across the terminals and the transistors 20 and 22 are protected.

It will be understood by those skilled in the art that the embodiments of the invention shown and described herein are subject to various modifications without departing from the scope and spirit of the invention. Accordingly, it should be understood that the invention is not limited by the exemplary embodiments shown and described.

I claim:
1. An electrical circuit comprising,
  a vibrator circuit comprising first and second alternately conducting solid state switches each including a primary current path therethrough, a transformer including a magnetic core and a primary winding, a pair of driving windings wound on said magnetic core for controlling said solid state switches, and a source of DC power, said vibrator circuit being capable of regenerative operation when an AC source is connected in circuit relationship therewith;
  a source of AC power;
  means for selectively connecting said AC source in circuit relationship with said vibrator circuit and disconnecting said DC source; and
  means inoperative to affect normal operation of said vibrator circuit with said DC source connected for preventing regenerative operation of said vibrator circuit when said AC source is connected.

2. An electrical circuit in accordance with claim 1 wherein said means comprises first and second auxiliary windings individually connected across the primary current paths of said solid state switches.

3. An electrical circuit in accordance with claim 2 wherein first and second diodes are individually connected in series with said first and second windings, respectively.

4. An electrical circuit in accordance with claim 3 wherein said first and second diodes are poled to be nonconducting when their associated solid state switches are conducting through the primary current paths thereof.

5. An electrical circuit in accordance with claim 2 wherein said first and second windings are wound on said transformer core.

6. An electrical circuit in accordance with claim 5 wherein the transformer primary winding comprises first and second windings, the number of turns of said first and second transformer windings being less than the number of turns of said first and second auxiliary windings.

7. An electrical circuit in accordance with claim 5 wherein the number of turns of said first and second auxiliary windings are equal and are greater than the number of turns of said first and second driving windings.

8. An electrical circuit in accordance with claim 2 wherein said solid state devices comprise transistors.

9. In an inverter circuit of the type comprising a DC source of potential, a transformer including a primary winding and core having a substantially rectangular magnetization curve, a solid state switching circuit comprising of a pair of transistors, each of said transistors including a control electrode and pair of main electrodes, and a pair of windings wound on said transformer core for individually controlling the states of said transistors, said inverter circuit being subject to exposure to a source of AC power, the improvement comprising a pair of auxiliary windings wound on said transformer core and individually connected across the main electrodes of said transistors for preventing regenerative operation of said inverter circuit when said inverter circuit is exposed to a source of AC power, said windings being inoperative to effect normal inverter operation.

10. In an inverter circuit in accordance with claim 9 wherein said means further includes a pair of diodes individually connected in series with said auxiliary windings.

References Cited

UNITED STATES PATENTS 3,044,023  7/1962  Floyd.
3,339,080  8/1967  Honlad _____ 321—45

JOHN F. COUCH, Primary Examiner

W. H. BEHA, JR., Assistant Examiner

U.S. Cl. X.R.

307—26; 321—11; 331—113.1